United States Patent Office 3,644,592
Patented Feb. 22, 1972

3,644,592
PROPYLENE POLYMER COMPOSITION CONTAINING SMALL AMOUNTS OF UREA, PHTHALIC ANHYDRIDE, AND PVC
Dixie E. Gilbert, Bartlesville, Okla., assignor to Phillips Petroleum Company
No Drawing. Filed Dec. 29, 1969, Ser. No. 888,869
Int. Cl. C08f 29/24
U.S. Cl. 260—897                                         12 Claims

ABSTRACT OF THE DISCLOSURE

Polypropylene and block copolymers of propylene and ethylene are improved in optical properties, gas permeability properties, and other properties by adding thereto phthalic anhydride, urea, and polyvinyl chloride.

---

This invention relates to improved polymers.

Frequently, it has been found desirable to modify the crystalline structure of olefin polymers. It has been found possible to greatly alter the physical properties by adding various materials to said polymers in order to nucleate the formation of crystals and thus avoid the formation of large crystal structures known as spherulites which form on cooling the polymers to a point below their crystalline freezing point. The addition of nucleating agents results in the formation of a crystal structure which is substantially free of large spherulites. This results in a polymer with physical properties which are better suited for certain applications. For example, it results in a polymer having greater transparency which is desirable in many packaging applications. Also, other properties of the polymers are improved which makes possible the fabrication of parts of thinner cross section which have a rigidity comparable to those made from thicker cross sections of polymer not containing a nucleating agent. For many uses it is also desirable to improve or reduce the gas permeability of said polymers.

The present invention provides a solution for the above-described problems. I have now discovered that the optical properties, the gas permeability properties, and other properties of polypropylene and block copolymers of ethylene and propylene can be improved by the addition thereto of small but effective amounts of phthalic anhydride, urea, and polyvinyl chloride. In a preferred embodiment of the invention, the phthalic anhydride and the urea are pre-reacted prior to incorporating same into said polymers.

An object of this invention is to provide improved polymers of propylene. Another object of this invention is to provide polymers of propylene having improved optical properties, improved gas permeability properties, and other improved properties. Another object of this invention is to provide a polypropylene, and block copolymers of propylene and ethylene, which have improved optical and decreased gas permeability properties. Still another object of this invention is to provide improved polymer compositions which are suitable for fabricating into products having improved optical and other physical properties. Other aspects, objects, and advantages of the invention will be apparent to those skilled in the art in view of this disclosure.

Thus, according to the invention, there is provided a composition comprising: a polymer selected from the group consisting of polypropylene and block copolymers of ethylene and propylene; and, based on the weight of said polymer, from 0.001 to 0.2 weight percent of phthalic anhydride, from 0.001 to 0.2 weight percent of urea, and from 0.01 to 0.15 weight percent of polyvinyl chloride; the total amount of said additives in said polymer being within the range of from 0.05 to 0.5 weight percent.

Further according to the invention, there is provided a method of modifying the crystal structure of a polymer selected from the group consisting of polypropylene and block copolymers of ethylene and propylene, said method comprising: admixing with said polymer, based on the weight of the polymer, from 0.001 to 0.2 weight percent of phthalic anhydride, from 0.001 to 0.2 weight percent of urea, and from 0.01 to 0.15 weight percent of polyvinyl chloride; the total amount of said additives in said polymer being within the range of from 0.05 to 0.5 weight percent.

Herein and in the claims, unless otherwise specified the term "polymer" is employed generically to include both homopolymers and copolymers. Applicable polymers for use in the practice of the invention include polypropylene and block copolymers of propylene and ethylene. Said polymers can be prepared by any of the methods known in the art. For example, one suitable method is that described in U.S. 2,825,721, issued Mar. 4, 1958 to Hogan et al. Other suitable methods include those utilizing the well known organometal catalyst systems comprising a transition metal compound such as a titanium halide and a reducing compound such as an aluminum alkyl. For example, see U.S. 3,358,056 issued Dec. 12, 1967 to Renaudo and U.S. 3,301,921 issued Jan. 31, 1967 to G. A. Short. The proportion of the polypropylene block and the polyethylene block in said block copolymers can be varied widely. However, since the effect of the additives is greater on the polypropylene block or predominantly polypropylene block, than on the polyethylene block or predominantly polyethylene block, it is preferred that said polypropylene or predominantly polypropylene block constitute at least about 50 weight percent of the total polymer. Thus, the polyethylene or predominantly polyethylene can constitute up to about 50, e.g., from about 10 to about 50, more preferably from about 15 to about 25 weight percent, of the total polymer.

The polyvinyl chloride used in the practicee of the invention can also be prepared by any of the methods known in the art. Polyvinyl chloride can be made by polymerizing vinyl chloride using the suspension, emulsion, bulk, and solution type processes. For example, U.S. 2,528,469 and 2,981,754 are exemplary of suspension processes for polymerizing vinyl chloride to polyvinyl chloride. Any suitable commercially available molding grade, preferably unplasticized, polyvinyl chloride can be used in the practice of the invention. Such resins are used in injection molding, blow molding, and extrusion to fabricate such articles as bottles, sheet, profiles and the like.

The additives of the invention are incorporated into said polymers in small but effective amounts. Based on the weight of the polymer, the concentration of said additives can be very low. For example, phthalic anhydride is preferably used in amounts within the range of from 0.001 to 0.2, more preferably 0.01 to 0.1, weight percent. The urea is preferably used in amounts within the range of 0.001 to 0.2, more preferably 0.01 to 0.1, weight percent. The polyvinyl chloride is preferably used in amounts within the range of from 0.01 to 0.15, more preferably 0.01 to 0.05, weight percent. The total amount of said additives used in the practice of the invention will preferably be within the range of from 0.05 to 0.5, more preferably 0.05 to 0.25, weight percent. In one presently preferred embodiment said phthalic anhydride, said urea, and said polyvinyl chloride are used respectively in about a 1:1:2 weight ratio. In another presently preferred embodiment, the phthalic anhydride and the urea can be pre-reacted in weight ratio of phthalic anhydride to urea within the range of 5:1 to 1:1, preferably about 2:1 to about 1:1, at a temperature within the range of about 200 to about 300° F., and the resulting reaction mixture is incorporated into the polymer along with the polyvinyl chloride.

The additives of the invention can be incorporated into the polymer in any known manner, such as by melt blending, dry blending, or solution blending. In order to effect the modification of crystal structure, the polymer must be crystallized from a melt phase. If melt blending is used, then the modified crystal structure will result on the initial cooling. If a technique such as dry blending is employed, the polymer and additive blend must be melted and then recrystallized. However, this is of no disadvantage since the polymer will generally be melted during the fabrication step. Of course, the polymer can be melted and recrystallized a number of times if desired.

The polymers used in the practice of the invention can contain other additives such as antioxidants, UV stabilizers, pigments, and the like. Said other additives can be added to the polymer at any convenient stage of the processing.

The improved polymers of the invention can be used to make substantially clear film, bottles or jars, meat trays and other articles by molding methods well known in the art.

Blends of what are normally considered incompatible polymers, e.g., polypropylene and polyvinyl chloride, often have a pearlescent appearance which is detrimental to transparency. It was surprising and unexpected that this pearlescent appearance was completely absent in sheet and film made in accordance with the invention.

The following examples will serve to further illustrate the invention.

EXAMPLE I

A mixture of two grams of phthalic anhydride and two grams of urea was heated at about 250° F. for 5 minutes, then cooled, and the resulting reaction mixture powdered. Said reaction mixture in an amount of 0.25 gram and powdered polyvinyl chloride in an amount of 0.25 gram was tumble blended with 500 grams of nominal four melt flow commercial grade polypropylene pellets which had been previously stabilized with about 0.15 part of dilaurylthiodipropionate and about 0.15 part of 2,6-di-tert-butyl-4-methylphenol per 100 parts of polymer. The resulting mixture was extruded at a melt temperature of about 400° F. from a 1-inch extruder in the form of a sheet about 35 mils thick. The sheet was cooled by passing it between metal rolls. A control sheet made from the same polymer, but containing no phthalic anhydride, no urea, and no polyvinyl chloride, was also prepared in essentially the same manner. The sheet containing the additives of the invention was much clearer than the control sheet since it was possible to read printed matter held below the sheet. This was not possible with the control sheet.

The polypropylene used in the above runs was a crystalline polypropylene having a 3 to 5 melt flow as measured by ASTM D 1238–62T, Condition L. Said polypropylene had a crystalline melting point of about 340° F., a density of about 0.905 gram per cc. (ASTM D 1505–63T), a tensile strength at yield of about 4700 p.s.i. (ASTM D 638–61T), a flexural modulus of about 210,000 p.s.i. (ASTM D 790–63), a Shore D hardness of about 77 (ASTM D 1706–61), and an Izod impact of about 0.7 foot pounds per inch notch (ASTM 256–56). Said polypropylene was manufactured in a conventional manner using a conventional catalyst system comprising aluminum reduced titanium chloride and an alkyl-aluminum chloride.

The polyvinyl chloride used in the above runs was prepared by the suspension process. Said polyvinyl chloride had a tensile strength of about 7000 p.s.i. (ASTM D 638–61T), a density of about 1.42 grams per cc. (ASTM D 1505–63T), and a heat deflection temperature of about 158° F. (ASTM D 648–56) at 264 p.s.i. fiber stress.

EXAMPLE II

A portion of the sheet from Example I containing the additives of the invention and a portion of the control sheet from Example I were each compression molded to form films having a thickness of about 5 to 10 mils. The oxygen permeability of said films was determined using the procedure of ASTM D 1434–63. The control film had an average oxygen permeability of 150 cc. per 100 square inch per mil per 24 hours. The invention film had a oxygen permeability of 70 cc. per 100 square inches per mil per 24 hours. These results clearly demonstrate the improved or reduced oxygen permeability of films prepared in accordance with the invention.

EXAMPLE III

Phthalic anhydride in an amount of 0.125 gram was dry blended with 500 grams of the same polypropylene as used in Example I. The resulting mixture was then extruded, in essentially the same manner as in Example I, in the form of a sheet about 35 mils thick. It was visually observed that the sheet thus formed was more transparent than the control sheet of Example I, but considerably less transparent than the sheet of Example I which contained the additives of the invention.

EXAMPLE IV

Representative portions of the sheets from Example I, and the above-described sheet from Example III, were evaluated for transmission of visible and ultraviolet light by means of a Cary Recording Spectrophotometer, Model 14, manufactured by Varian Associates, Palo Alto, Calif. An appropriately sized sample from each sheet was inserted in the sample holder provided with the instrument and the amount of absorbence was determined at two positions for each sample. The absorbence data were then converted into percent transmission. The average values for each wavelength of light used are set forth in Table I below.

TABLE I.—LIGHT TRANSMISSION, PERCENT

| Millimicrons | PP [1] control sheet no additive (Ex. I) | PP [1] sheet containing PA [2] only (Ex. III) | Invention PP [1] sheet containing PA [2], U, [3] and PVC [4] (Ex. I) |
|---|---|---|---|
| Visible light: | | | |
| 700 | 20 | 23 | 43 |
| 550 | 15 | 16 | 30 |
| 400 | 9 | 9 | 14 |
| U.V. light: | | | |
| 400 | 11 | 11 | 17 |
| 350 | 8 | 8 | 11 |
| 300 | 3 | <1.3 | 5 |
| 290 | 1.5 | <1 | 2 |

[1] Polypropylene.
[2] Phthalic anhydride.
[3] Urea.
[4] Polyvinyl chloride.

The data in the above Table I clearly demonstrate the improved clarity or optical properties of polypropylene sheet or film prepared in accordance with the invention.

The data given in the above Examples I to IV clearly demonstrate the improved optical properties and improved (reduced) gas permeability properties of polypropylene sheet or film prepared in accordance with the invention. Thus, the sheet or film prepared in accordance with the invention not only has improved optical properties, but also has reduced gas permeability properties. This greatly increases the number of articles or materials which can be advantageously packaged in containers fabricated from film or sheet made in accordance with the invention.

Sheet or film made in accordance with the invention have improved impact strength, flexural modulus, tensile strength, and other properties.

Still another advantage is that void formation in molded specimens, as by injection molding, is reduced. Sheet or film made in accordance with the invention also has a higher crystalline freeze point, usually in the order of 5 to 8° C. This makes possible a decrease in cycle time in forming molded articles. Also, due to the smaller crystals, the molded objects will have smoother surfaces.

While certain embodiments of the invention have been described for illustrative purposes, the invention is not limited thereto. Various other modifications of the invention will be apparent to those skilled in the art in view of this disclosure. Such modifications are within the spirit and scope of the disclosure.

I claim:
1. A composition comprising: a polymer selected from the group consisting of polypropylene and block copolymers of ethylene and propylene; and, based on the weight of said polymer, from 0.001 to 0.2 weight percent of phthalic anhydride, from 0.001 to 0.2 weight percent of urea, and from 0.01 to 0.15 weight percent of polyvinyl chloride; the total amount of said additives in said polymer being within the range of from 0.05 to 0.5 weight percent.

2. A composition according to claim 1 wherein: said phthalic anhydride and said urea are pre-reacted in a weight ratio of phthalic anhydride to urea within the range of from about 5:1 to 1:1; and the resulting reaction mixture is present in said composition.

3. A composition according to claim 1 wherein said phthalic anhydride, said urea, and said polyvinyl chloride are present respectively in about a 1:1:2 weight ratio.

4. A composition according to claim 3 wherein said phthalic anhydride and said urea are pre-reacted in said 1:1 weight ratio at a temperature within the range of from about 200 to about 300° F., and the resulting reaction mixture is present in said composition.

5. A composition according to claim 1 wherein said polymer is polypropylene.

6. A composition according to claim 4 wherein said polymer is polypropylene.

7. A method of modifying the crystal structure of a polymer selected from the group consisting of polypropylene and block copolymers of ethylene and propylene, said method comprising: admixing with said polymer, based on the weight of the polymer, from 0.001 to 0.2 weight percent of phthalic anhydride, from 0.001 to 0.2 weight percent of urea, and from 0.01 to 0.15 weight percent of polyvinyl chloride; the total amount of said additives in said polymer being within the range of from 0.05 to 0.5 weight percent.

8. A method according to claim 7 wherein: said phthalic anhydride and said urea are pre-reacted in a weight ratio of phthalic anhydride to urea within the range of from 5:1 to 1:1; and the resulting reaction mixture is admixed with said polymer.

9. A method according to claim 7 wherein said phthalic anhydride, said urea, and said polyvinyl chloride are present respectively in a 1:1:2 weight ratio.

10. A method according to claim 9 wherein said phthalic anhydride and said urea are pre-reacted in said 1:1 weight ratio at a temperature within the range of from about 200 to about 300° F., and the resulting reaction mixture is admixed with said polymer.

11. A method according to claim 7 wherein said polymer is polypropylene.

12. A method according to claim 10 wherein said polymer is polypropylene.

References Cited

UNITED STATES PATENTS

| 3,301,921 | 1/1967 | Short | 260—878 |
| 3,303,148 | 2/1967 | Joyner et al. | 260—17 |
| 3,326,828 | 6/1967 | Melio | 260—23 |

SAMUEL H. BLECH, Primary Examiner

C. J. SECCURO, Assistant Examiner

U.S. Cl. X.R.

260—96.5, 876